US011699354B2

(12) United States Patent
Nashe, Jr.

(10) Patent No.: US 11,699,354 B2
(45) Date of Patent: *Jul. 11, 2023

(54) EDUCATIONAL CONTENT DELIVERY SYSTEM FOR CONTROLLED ENVIRONMENTS

(71) Applicant: **Global Tel*Link Corporation**, Reston, VA (US)

(72) Inventor: Turner Nashe, Jr., Cane Ridge, TN (US)

(73) Assignee: **Global Tel*Link Corporation**, Reston, VA (US)

(*) Notice: Subject to any disclaimer, the term of this patent is extended or adjusted under 35 U.S.C. 154(b) by 195 days.

This patent is subject to a terminal disclaimer.

(21) Appl. No.: 17/131,971

(22) Filed: Dec. 23, 2020

(65) Prior Publication Data
US 2021/0118314 A1    Apr. 22, 2021

Related U.S. Application Data

(63) Continuation of application No. 15/628,284, filed on Jun. 20, 2017, now Pat. No. 10,896,622.

(51) Int. Cl.
*G09B 5/08*    (2006.01)
*G06F 21/10*   (2013.01)
(Continued)

(52) U.S. Cl.
CPC ............... *G09B 5/08* (2013.01); *G06F 21/10* (2013.01); *G06F 21/31* (2013.01);
(Continued)

(58) Field of Classification Search
CPC .......... G06F 21/10; G06F 21/31; G06F 21/62; G09B 5/06; G09B 5/08; H04L 63/0428; H04L 63/083

See application file for complete search history.

(56) References Cited

U.S. PATENT DOCUMENTS 6,181,253 B1 * 1/2001 Eschenbach ......... G08B 21/245
340/8.1
6,734,900 B2    5/2004 Mayhew
(Continued)

FOREIGN PATENT DOCUMENTS

WO    WO 2013/096944 A1    6/2013

OTHER PUBLICATIONS

Copyright Registration Record for "iPhone: The Missing Manual," 6th ed., 2012; 1 page.
(Continued)

*Primary Examiner* — Malina D. Blaise
(74) *Attorney, Agent, or Firm* — Sterne, Kessler, Goldstein & Fox P.L.L.C.

(57) ABSTRACT

This disclosure presents a method and system to securely distribute educational content to residents of controlled-environment facilities participating in voluntary educational programs. The method and system involve the provision of portable devices to residents. The residents view externally managed educational content on the portable devices. Users outside of the controlled-environment facility configure classes and students and tailor curricula for individual residents. A portable device downloads the appropriate educational content through a synchronization process that occurs within the controlled-environment facility by interfacing with a synchronization and charging station. The portable device functions only to access the educational content and does not allow any unrelated capabilities or functionalities.

20 Claims, 7 Drawing Sheets

(51) Int. Cl.
*G06F 21/31* (2013.01)
*G09B 5/06* (2006.01)
*G06F 21/62* (2013.01)
*H04L 9/40* (2022.01)

(52) U.S. Cl.
CPC ........... *G06F 21/6218* (2013.01); *G09B 5/06* (2013.01); *G06F 2221/2111* (2013.01); *H04L 63/083* (2013.01)

(56) References Cited

U.S. PATENT DOCUMENTS

| | | | |
|---|---|---|---|
| 6,810,527 B1 | 10/2004 | Conrad et al. | |
| 7,027,659 B1 | 4/2006 | Thomas | |
| 7,911,513 B2 | 3/2011 | Garrison et al. | |
| 8,537,981 B1 | 9/2013 | Cyriac et al. | |
| 8,832,374 B1* | 9/2014 | Schaefers | G06F 21/32 711/115 |
| 8,917,848 B2 | 12/2014 | Torgersrud et al. | |
| 8,929,525 B1* | 1/2015 | Edwards | H04N 7/147 379/188 |
| 8,955,029 B2 | 2/2015 | Lewis | |
| 9,083,850 B1* | 7/2015 | Higgs | H04N 7/147 |
| 9,106,789 B1 | 8/2015 | Shipman, Jr. et al. | |
| 9,332,014 B2 | 5/2016 | Keiser et al. | |
| 9,674,198 B1 | 6/2017 | Hodge | |
| 10,078,739 B1 | 9/2018 | Higgs et al. | |
| 2002/0002541 A1 | 1/2002 | Williams | |
| 2004/0162063 A1 | 8/2004 | Quinones et al. | |
| 2004/0162136 A1 | 8/2004 | Yamato et al. | |
| 2004/0172652 A1 | 9/2004 | Fisk et al. | |
| 2005/0022229 A1 | 1/2005 | Gabriel et al. | |
| 2006/0280177 A1* | 12/2006 | Gupta | H04L 65/1101 370/465 |
| 2007/0165649 A1 | 7/2007 | Moritz | |
| 2007/0180509 A1* | 8/2007 | Swartz | G06F 21/575 726/9 |
| 2008/0059743 A1 | 3/2008 | Bychkov et al. | |
| 2008/0201158 A1 | 8/2008 | Johnson et al. | |
| 2009/0013359 A1 | 1/2009 | Butler et al. | |
| 2009/0202971 A1 | 8/2009 | Cortez | |
| 2009/0240586 A1 | 9/2009 | Ramer et al. | |
| 2010/0088772 A1* | 4/2010 | Mullin | G06F 21/78 709/212 |
| 2010/0094878 A1 | 4/2010 | Soroca et al. | |
| 2010/0253521 A1 | 10/2010 | Williams, Sr. et al. | |
| 2011/0065419 A1 | 3/2011 | Book et al. | |
| 2011/0167440 A1 | 7/2011 | Greenfield | |
| 2011/0237221 A1 | 9/2011 | Prakash et al. | |
| 2011/0249073 A1 | 10/2011 | Cranfill et al. | |
| 2011/0307548 A1 | 12/2011 | Fisk et al. | |
| 2012/0206566 A1 | 8/2012 | Fedoseyeva | |
| 2012/0257583 A1 | 10/2012 | Keiser et al. | |
| 2012/0262271 A1* | 10/2012 | Torgersrud | G06F 21/32 382/118 |
| 2012/0324244 A1 | 12/2012 | Zipperer et al. | |
| 2013/0179949 A1 | 7/2013 | Shapiro | |
| 2013/0191445 A1 | 7/2013 | Gayman et al. | |
| 2013/0212507 A1 | 8/2013 | Fedoseyeva et al. | |
| 2013/0225151 A1* | 8/2013 | King | H04W 4/21 455/419 |
| 2013/0252575 A1 | 9/2013 | Ewell et al. | |
| 2014/0033230 A1 | 1/2014 | Hanna et al. | |
| 2014/0078652 A1* | 3/2014 | Kamen | H05K 7/00 361/679.01 |
| 2014/0215391 A1* | 7/2014 | Little | G06F 40/197 715/810 |
| 2014/0218466 A1 | 8/2014 | Bloms et al. | |
| 2014/0253663 A1* | 9/2014 | Edwards | H04M 3/38 348/14.01 |
| 2014/0267547 A1 | 9/2014 | Torgersrud et al. | |
| 2014/0270126 A1 | 9/2014 | Torgersrud et al. | |
| 2014/0273929 A1 | 9/2014 | Torgersrud | |
| 2014/0282898 A1 | 9/2014 | Torgersrud | |
| 2015/0050910 A1 | 2/2015 | Torgersrud | |
| 2015/0188925 A1 | 7/2015 | Gupta | |
| 2016/0205800 A1* | 7/2016 | Roberts | H02J 7/0045 361/809 |
| 2016/0276852 A1* | 9/2016 | Roberts | H05K 7/14 |
| 2016/0330084 A1 | 11/2016 | Hunter et al. | |
| 2017/0041454 A1 | 2/2017 | Nicholls et al. | |
| 2017/0272435 A1 | 9/2017 | Hodge | |
| 2017/0272440 A1 | 9/2017 | Hodge | |
| 2018/0366015 A1 | 12/2018 | Nashe, Jr. | |

OTHER PUBLICATIONS

DSKeye Gigabit Product Brief, Bitec Ltd. 2007; 2 pages.
Excerpt from Merriam-Webster's Collegiate Dictionary, Tenth Edition, 2002; p. 841.
Excerpt from The American Heritage Dictionary, 5th Ed. (2016); p. 679.
Excerpts from "iPhone: The Missing Manual," 6th ed., Sebastopol, CA: O'Reilly Media, 2012; 556 (submitted in 10 parts).
File History of U.S. Pat. No. 9,083,850, U.S. Appl. No. 13/931,857, filed Jul. 14, 2015.
Gotsopoulos et al., "Remote Controlled DSP Based Image Capturing and Processing System Featuring Two-Axis Motion," Proceedings of the 4th European DSP in Education and Research Conference, Dec. 1-2, 2010; pp. 32-36.
International Search Report and Written Opinion directed to International Patent Appl. No. PCT/US2017/031317, dated Aug. 2, 2017; 16 pages.
International Search Report and Written Opinion directed to International Patent Application No. PCT/US2017/022163, dated Jun. 9, 2017; 12 pages.
Prosecution History of U.S. Pat. No. 8,929,525, U.S. Appl. No. 14/323,582, filed Jul. 3, 2014.
U.S. Appl. No. 61/801,861, filed Mar. 15, 2013; 77 pages.

* cited by examiner

EDUCATIONAL CONTENT DELIVERY SYSTEM FOR CONTROLLED ENVIRONMENTS

CROSS-REFERENCE TO RELATED APPLICATIONS

This application is continuation of U.S. patent application Ser. No. 15/628,284, by Nashe, titled "Educational Content Delivery System For Controlled Environments," which is hereby incorporated by reference in its entirety.

BACKGROUND

Field

This disclosure relates to a secure delivery system for distributing educational content to residents participating in educational programs in controlled-environment facilities.

Background

In a controlled environment, such as a correctional facility, residents enroll in voluntary education programs in order to earn college credit or pursue a high-school equivalency degree. These programs advance important rehabilitative goals and combat recidivism among residents ultimately released. However, educational courses require highly-specialized, curriculum dependent materials. Maintaining hard copies of this multitude of educational content creates significant problems due to limited financial and spatial resources and operating constraints within controlled-environment facilities. Accordingly, a need exists for new technologies and components to securely distribute educational content in such a controlled-environment facility.

BRIEF DESCRIPTION OF THE DRAWINGS/FIGURES

The accompanying drawings, which are incorporated herein and form a part of the specification, illustrate embodiments of the present disclosure and, together with the description, further explain the principles of the disclosure and enable a person skilled in the pertinent art(s) to make and use the embodiments.

Figure 1:
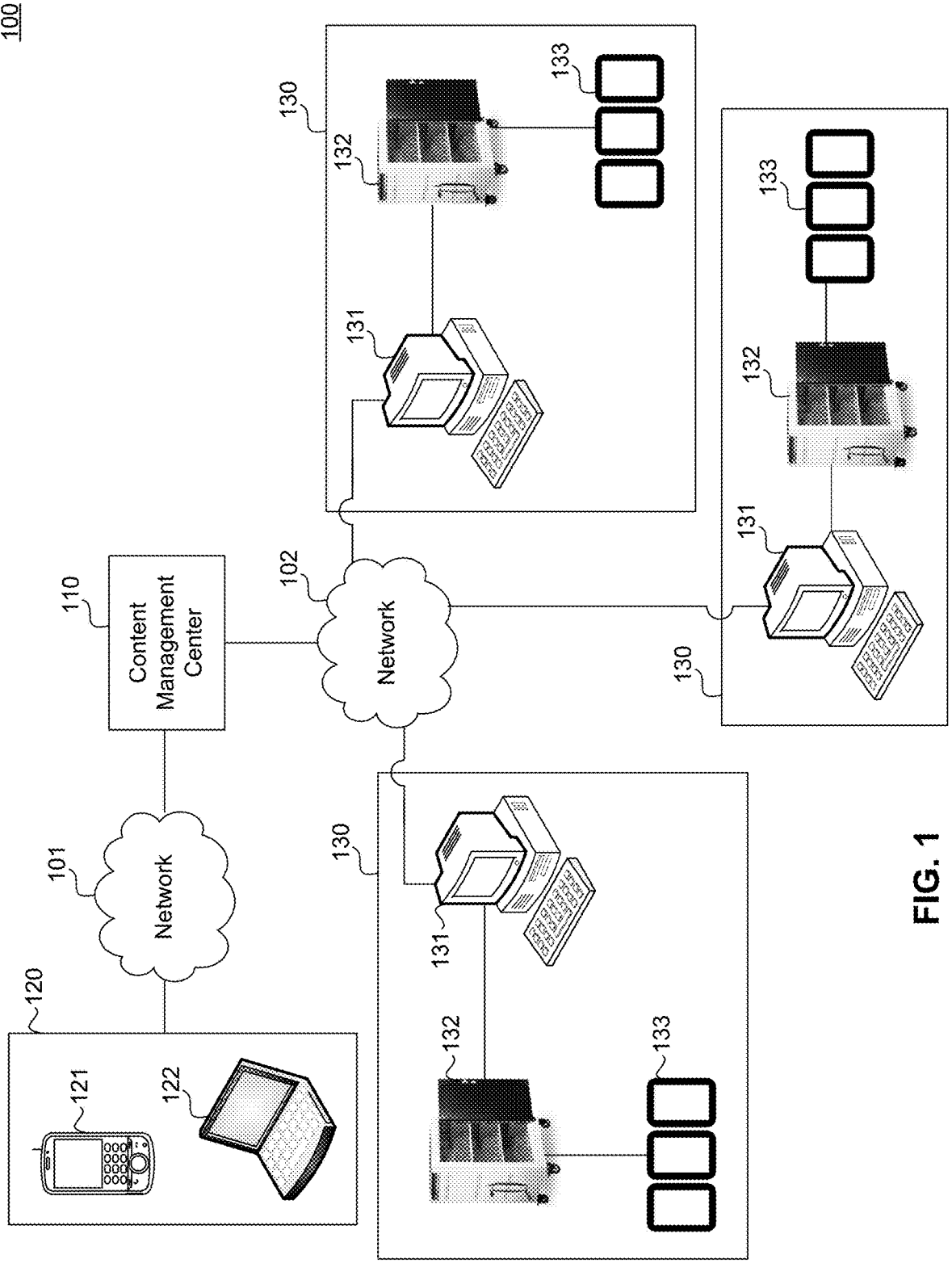
FIG. 1 illustrates a block diagram of an exemplary educational content delivery system, according to the embodiments of the present disclosure.

The present disclosure will be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment does not necessarily include the particular feature, structure, or characteristic. Moreover, such phrases do not necessarily refer to the same exemplary embodiment. Further, when the disclosure describes a particular feature, structure, or characteristic in connection with an exemplary embodiment, those skilled in the relevant art(s) will know how to affect such feature, structure, or characteristic in connection with other exemplary embodiments, whether or not explicitly described.

The exemplary embodiments described herein provide illustrative examples and are not limiting. Other exemplary embodiments are possible, and modifications may be made to the exemplary embodiments within the spirit and scope of the disclosure. Therefore, the Detailed Description does not limit the disclosure. Rather, the scope of the disclosure is defined only in accordance with the below claims and their equivalents.

Hardware (e.g., circuits), firmware, software, or any combination thereof may be used to achieve the embodiments. Embodiments may also be implemented as instructions stored on a machine-readable medium and read and executed by one or more processors. A machine-readable medium includes any mechanism for storing or transmitting information in a form readable by a machine (e.g., a computing device). For example, in some embodiments a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions result from computing devices, processors, controllers, or other devices executing the firmware, software, routines, and/or instructions. Further, any of the implementation variations may be carried out by a general purpose computer, as described below.

Any reference to the term "module" shall be understood to include at least one of software, firmware, and hardware (such as one or more circuit, microchip, or device, or any combination thereof), and any combination thereof. In addition, those skilled in relevant art(s) will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will fully reveal the general nature of the disclosure so that others can, by applying knowledge of those skilled in relevant art(s), readily modify and/or customize for various applications such exemplary embodiments, without undue experimentation and without departing from the spirit and scope of the disclosure. Therefore, such modifications fall within the meaning and plurality of equivalents of the exemplary embodiments based upon the teaching and guidance presented herein. Here, the phraseology or terminology serves the purpose of description, not limitation, such that the terminology or phraseology of the present specification should be interpreted by those skilled in relevant art(s) in light of the teachings herein.

Controlled-environment facilities endeavor to provide residents with access to educational opportunities for rehabilitative purposes and to curtail recidivism in residents ultimately released. However, educational courses require highly specialized, curriculum-dependent materials, which can be expensive to acquire and maintain. A solution lies in specially designed, secure, portable devices containing preloaded, resident-specific educational content. Given the operating constraints within a controlled-environment facility, these portable devices must be carefully limited in content and functionality to ensure that residents do not utilize the portable devices for unsanctioned activities. Moreover, the portable devices receive educational content from teachers administering course curricula from locations entirely outside of the controlled-environment facility.

Exemplary Educational Content Delivery System

Educational content, as described throughout, comprises the materials, digital or otherwise, utilized by a student-resident in completing a voluntary education program. Educational content includes licensed books and lectures pertaining to a curriculum in a voluntary education program, such as a course to earn college credit or pursue a high-school equivalency degree. Educational content also can include homework, coursework, and recommended assignments. The totality of the educational content can be referred to as a "digital backpack."

A controlled-environment facility is a correctional institution such as a prison or jail. The residents are inmates incarcerated in the correctional institution. A controlled-environment facility could further be any type of facility providing access to regimented, secure, digital educational content, which could include hospitals, nursing homes, schools, office buildings, government agencies, etc., or any other facility or environment where residents' conduct is regulated and scrutinized.

These types of controlled-environment facilities inherently have unique requirements for communications, security, and technological access that do not exist in other, non-controlled environments. Utilizing a portable device to distribute educational content solves numerous practical issues, especially when compared to maintaining large libraries of textbooks and other materials. The portable-device approach provides significant cost savings, conserves physical space, and enhances security.

However, providing portable devices to residents in a controlled-environment facility creates different problems. Authorities have a strong interest in restricting the functionality of the portable devices because of the need to ensure that residents are not using the portable devices for unsanctioned pursuits. A portable device in a controlled-environment facility must be secure against tampering and manipulation. A portable device in a controlled-environment facility must accommodate a broad swath of file types and content formats because the teachers externally administering the educational content do not necessarily adhere to a standardize format or approach. Other additional concerns and/or requirements unique to a controlled-environment facility that are not discussed here may arise.

FIG. 1 illustrates a block diagram of an exemplary educational content delivery system 100, according to embodiments of the present disclosure. Educational content delivery system 100 includes content management center 110, outside workstation 120, and controlled-environment facility 130. Potentially, in an exemplary educational content delivery system 100, multiple instances of controlled-environment facility 130 are geographically dispersed, with each facility servicing a different set of residents in a different location.

Content management center 110 consists of a plurality of servers processing web-based traffic constituting uploads and downloads of licensed educational content and HTTP request methods. Front-end servers employ a standard web server technology, for instance Microsoft IIS or Apache, to listen for, process, and respond to any incoming requests. Content management center 110 returns pages to the users via HTTP, which it formulates in accordance with hypertext transfer protocol W3C standards. The returned pages also include images, stylesheets, and scripts, the content and nature of which will be appreciated by those skilled in the relevant art(s).

Content management center 110 utilizes a multi-tiered architecture to accommodate incoming requests. Content management center 110 incorporates a presentation tier providing users the ability to access, organize, change, delete, and otherwise administer the educational content via a graphical, web-based user interface. Content management center 110 encompasses a logic tier to organize educational content in the back-end and provide advanced business logic and reporting capabilities. Content management center 110 includes a data tier, which stores the educational content and catalogues information about the facilities, residents, classes, and curricula related to the educational content applies. In an embodiment, this data tier harnesses any commercially available database management system such as Microsoft Access, Microsoft SQL server, an Oracle database, an IBM database, etc. These tiers maintain communicative connections via traditional networking infrastructure such as routers, switches, hubs, firewalls, etc. In an embodiment, the various tiers cohabit one computer workstation.

Content management center 110 implements a centralized storage area network (SAN), network-attached storage (NAS), redundant array of independent disks, and/or any other configuration of storage devices to supply sufficient storage capacity to archive the full panoply of educational content. Sufficient storage alternatively exists in any other physically attached magnetic storage, cloud storage, or any additional storage medium. In an embodiment, content management center 110 deploys a commonly utilized hard-disk interface, such as ATA, SATA, SCSI, SAS, and/or fibre for interfacing with a storage medium.

Outside workstation 120 connects to content management center 110 via network 101, which includes any or all of a WAN, the Internet, or other public network. Outside workstation 120 includes one or more devices available to outsiders such as wireless communication device 121 and/or computer station 122. Authorized users of outside workstation 120 manage the educational content stored in content management center 110 by performing various administrative tasks, for example creating a class of students and associating particular educational resources with that class to form a curriculum. These users transmit information to content management center 110 through a web portal using a transport protocol, such as TCP/IP. The interaction between outside workstation 120 and content management center 110 is described in further detail below in the discussion of FIG. 2.

Only authorized users can access content management center 110 from an outside workstation 120. Content management center 110 authorizes connections from outside workstation 120 using username/password combinations, which content management center 110 encrypts, stores, and references. In some embodiments, content management center 110 utilizes an alternate authentication methodology, such as two-factor authentication, token authentication, biometric data, etc., to identify, authorize, encrypt, and account for user connections. The level of access granted to users of outside workstation 120 varies depending on the user type; therefore, the functionality provided to users differs depending on the individual user accessing the system.

Controlled-environment facility 130 is an exemplary controlled-environment facility, such as a prison. Potentially, educational content delivery system 100 consists of more than one instance of controlled-environment facility 130. Controlled-environment facility 130 consists of synchronization management console 131, charging and synchronization station 132, and one or more portable devices 133. Controlled-environment facility 130 connects to content management center 110 via network 102, which includes any or all of a WAN, the Internet, or other public network.

Synchronization management console 131 is a computer workstation with synchronization software installed thereon. Synchronization management console 131 includes computing resources, input/output devices, and a central processing unit. The central processing unit runs a standard operating system such as Microsoft Windows™ or a customized operating system. The central processing unit executes instructions stored on storage local to the central processing unit, for example a hard drive or solid state drive.

Synchronization management console 131 serves as a conduit connecting content management center 110 to charging and synchronization station 132. Synchronization management console 131 facilitates the downloading of educational content to a portable device docked in charging and synchronization station 132. Synchronization management console 131 examines the educational curricula associated to the resident to which the portable device is assigned. After determining the differences between the educational content on the portable device and the educational content associated with that resident's classes in content management center 110, synchronization management console 131 formulates an appropriate web request to pass to content management center 110. The web request seeks to download any missing educational content from content management center 110. Using HTTP download protocols, synchronization management console 131 opens a consistent pipeline connection to the content management center 110 server where the educational content resides and copies the educational content to a locally attached storage device. The educational content is then pushed to the attached portable device during the final phase of the synchronization process.

For example, a user of workstation 120 could add a particular digital textbook to the curriculum for a particular resident. Then, when the resident's portable device attaches to charging and synchronization station 132, synchronization management console 131 would compare the educational content on the portable device to the updated curriculum in content management center 110. Synchronization management console 131 would recognize that that particular digital book does not exist on the portable device and download it to a locally attached storage device. Subsequently, the digital textbook would be pushed to the portable device where it could be read by the assigned resident.

Synchronization management console 131 also provides functionality for modifying and organizing records stored in content management center 110 by connecting through an HTTP connection to content management center 110. Similar to connections to content management center 110 from outside workstation 120, users of synchronization management console 131 transmit information to content management center 110 through a web portal using a transport protocol, such as TCP/IP. These users receive pages back from content management center 110 in W3C-standard adherent HTML, the format and nature of which will be familiar to one skilled in the relevant art(s). Users from synchronization management console 131 connecting to content management center 110 via the web portal: update information about the controlled-environment facility, configure portable device information, engage the synchronization module, run device diagnostics, and perform other procedures not here listed.

Synchronization management console 131 connects to charging and synchronization station 132 via a USB connection. Alternatively, synchronization management console 131 connects to charging and synchronization station 132 wirelessly, via a Local-Area Network (LAN), a Wide-Area Network (WAN), or the Internet, depending on the location of the synchronization management console 131 in relation to charging and synchronization station 132.

Figure 3:
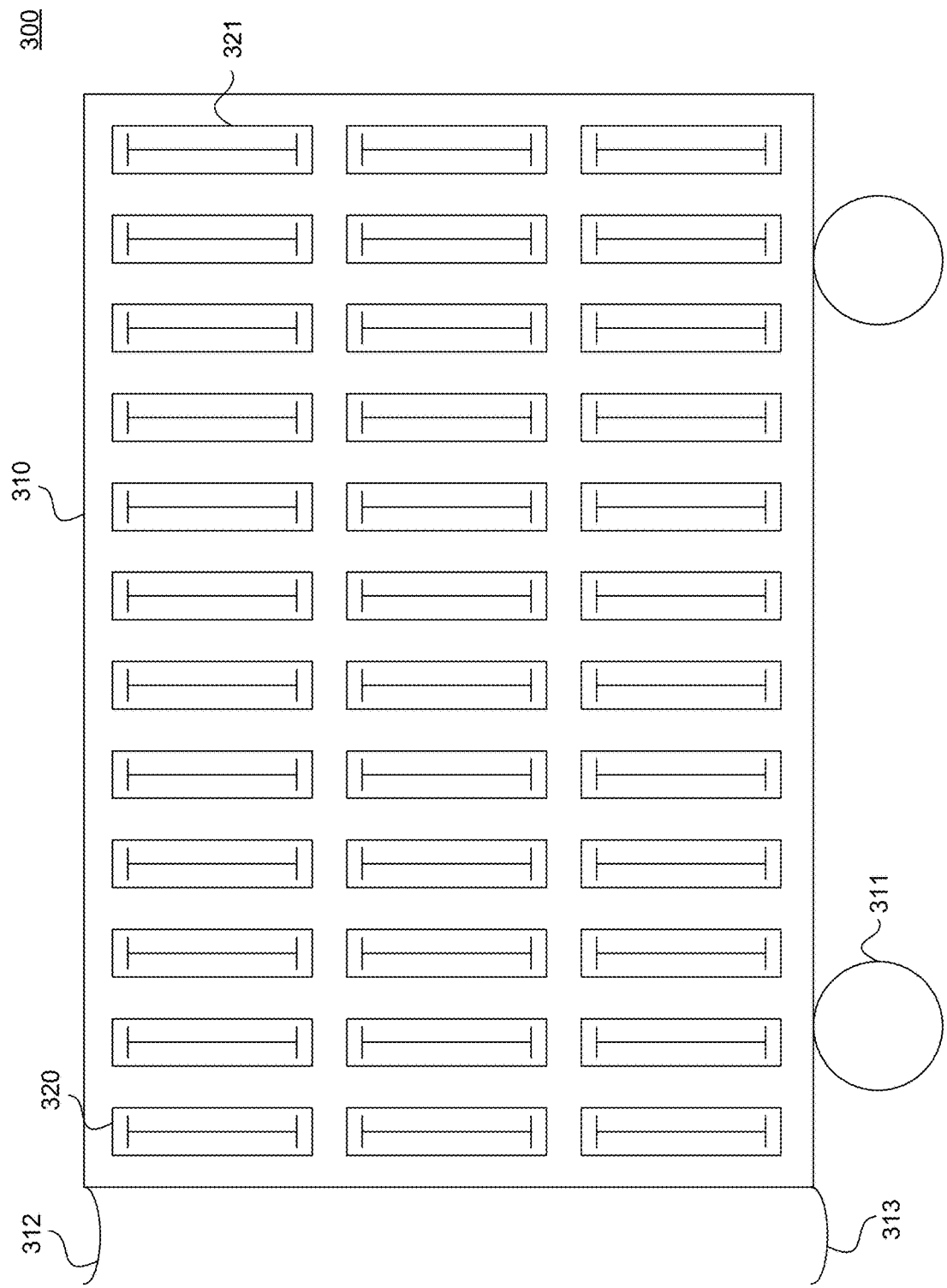
FIG. 3 illustrates a diagram of an exemplary charging and synchronization station, according to the embodiments of the present disclosure.

Charging and synchronization station 132 is a mobile cabinet that houses, charges, syncs, and stores one or more portable devices 133. Charging and synchronization station 132 receives power through a power cord plugging directly into a wall outlet. Charging and synchronization station 132 features numerous charging bays for directly interfacing with one or more portable devices 133. The discussion below describing FIG. 3 provides further detail on charging and synchronization station 132.

Figure 4:
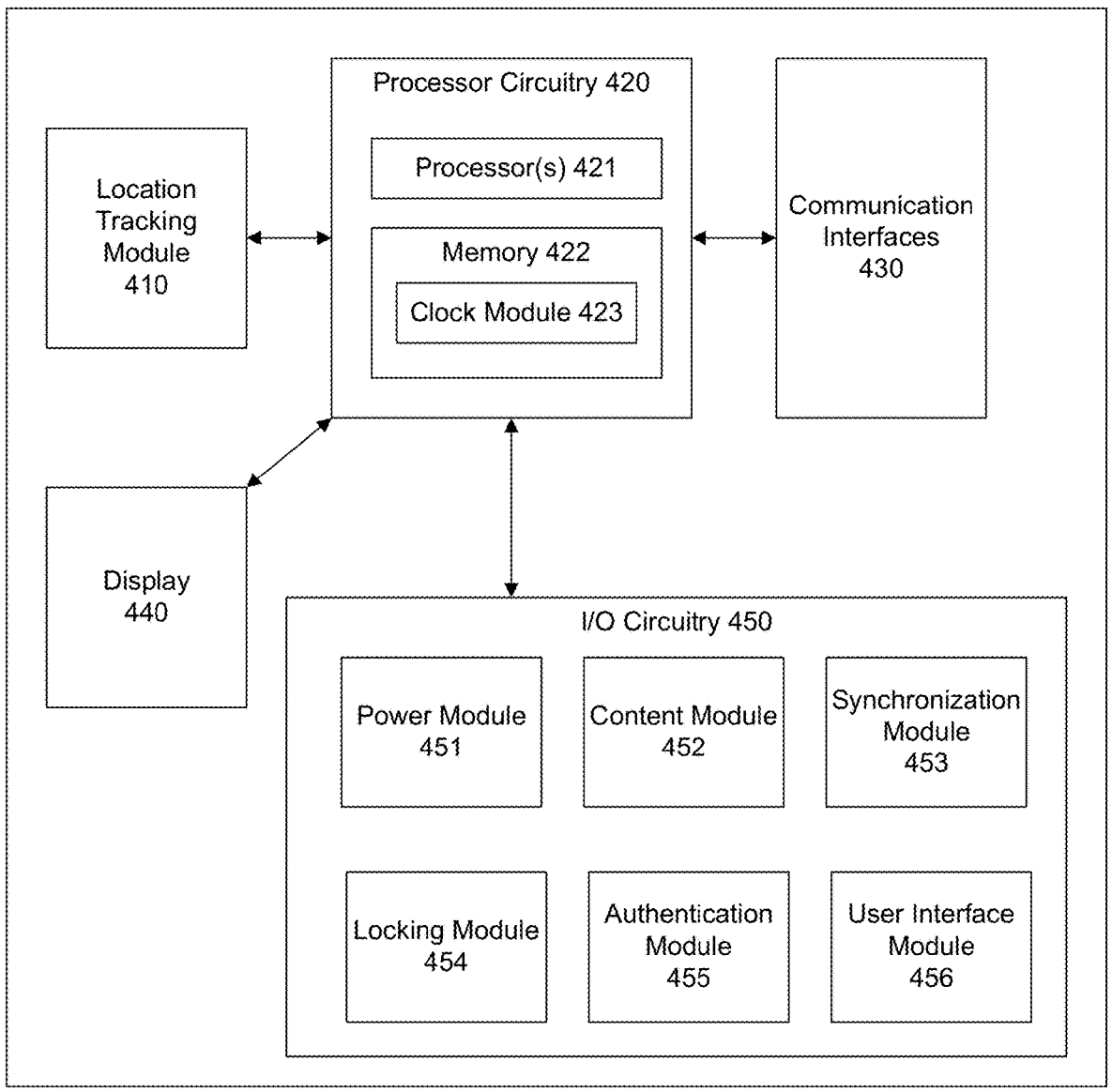
FIG. 4 illustrates a portable device used in the exemplary educational content delivery system, according to the embodiments of the present disclosure.

One or more portable devices 133 connect to charging and synchronization station 132 via a USB-Type-A mini connector. One or more portable devices 133 both charge and download educational content via these connections. In an embodiment, one or more portable devices 133 interface with charging and synchronization station 132 via a data bus, e.g., Ethernet, HDMI, and/or USB for data exchange, while receiving a power charge via a separate connection directly from a wall outlet. The data connection also could be achieved via a secure wireless connection via a Local-Area Network (LAN), a Wide-Area Network (WAN), or the Internet. The discussion below detailing FIG. 4 provides further information on the one or more portable devices 133.

Exemplary Content Management Center

Figure 2:
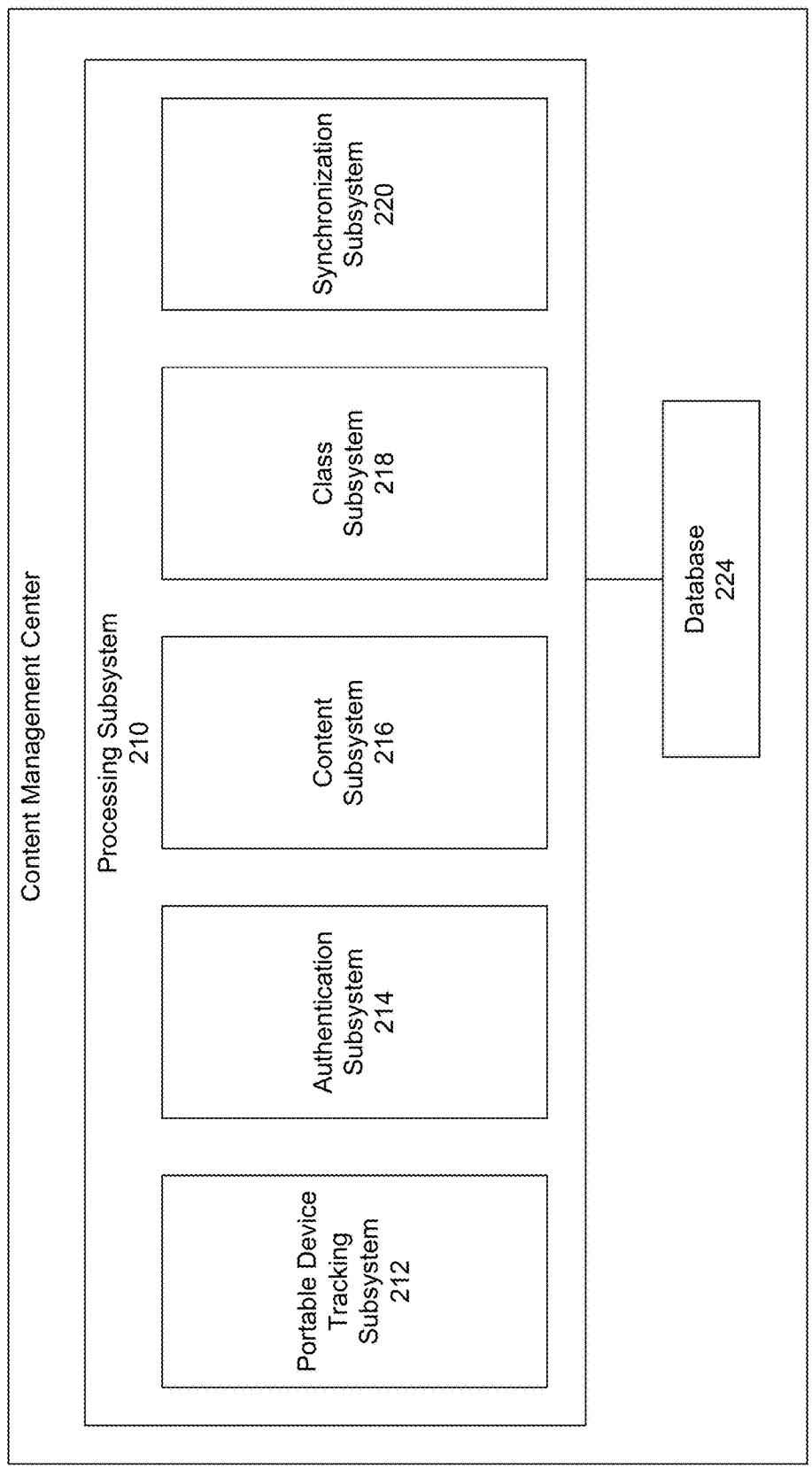
FIG. 2 illustrates a block diagram of an exemplary content management center, according to the embodiments of the present disclosure.

FIG. 2 illustrates a block diagram of exemplary content management center 200, according to the embodiments of the present disclosure. Content management center 200 represents an exemplary embodiment of content management center 110, as displayed in FIG. 1. Content management center 200 includes processing subsystem 210 and database 224.

Processing subsystem 210 includes one or more processors, computers, or servers identified as subsystems, which can be construed as individual physical hardware devices or virtual servers. Processing subsystem 210 scales to match the number of simultaneous user connections supported from outside connectors, such as those from outside workstation 120 of FIG. 1. Processing subsystem 210 includes portable device tracking subsystem 212, authentication subsystem 214, content subsystem 216, class subsystem 218, and synchronization subsystem 220.

Portable device tracking subsystem 212 maintains detailed records regarding one or more portable devices, such as the one or more portable devices 133 mentioned in FIG. 1. Portable device tracking subsystem 212 records information about the "institution" or "facility" that one or more portable devices 133 inhabit, where an "institution" or "facility" reflects an overall location such as the name, address, or other identifier. For example, the "facility" field could be the name of a prison complex, e.g., "Eastern State Penitentiary". Portable device tracking subsystem 212 also records the "location," wherein the "location" is the specific place within an "institution" or "facility" where one or more portable devices 133 are located. For example, the "location" could be "Cell 87." Portable device tracking subsystem 212 also tracks the resident to which one or more portable devices 133 are assigned. This resident is the individual who actually accesses and utilizes the educational content deployed on the portable device.

Authentication subsystem 214 is responsible for securing and protecting content management center 200 while granting authorized users access to appropriate system functions. Authentication subsystem 214 obtains and stores user-profile information for individuals with access to content management center 200. Such user-profile information includes full names, usernames, encrypted passwords, titles, addresses, phone numbers, user types, birthdates, and other fields not here listed. Authentication subsystem 214 tracks user-profile information for both users from outside workstation 120 and users from within controlled-facility environment 130.

The location from which the user is accessing content management center 200 determines the use cases available to the authorized user. Users from outside workstation 120 upload licensed educational content to the storage facilities and create, manage, and administer classes, students, and curricula. Users from controlled-environment facility 130 download educational content, synchronize portable devices, and update facility information.

Authentication subsystem 214 authenticates a user using one or more authentication methods. Authentication subsystem 214 utilizes encrypted user passwords adhering to modern cryptographic principles to ensure that users accessing content management center 200 possess valid credentials. User profile information determines the level of access that a validated user receives. For example, principals and vice principals retain higher access levels than teachers, leading to access to additional capabilities and functions. For instance, only a user with principal-level access rights can upload additional educational content to the repository; an ordinary user can only select from already-uploaded educational content.

Content subsystem 216 manages the educational content stored in the repository and any licenses associated therewith. Content subsystem 216 maintains a list of the available licenses applicable to educational content included in various classes and curricula. Content subsystem 216 searches "allocated" and "in use" lookup tables regarding a particular license to ascertain the availability of additional licenses. Similarly, content subsystem 216 compares the current date to the license-expiration date to determine the ongoing viability of a license. Content subsystem 216 performs license analyses regarding a particular portable device when the portable device interfaces with synchronization and charging station 132 in order to evaluate the legality of the educational content currently deployed thereon.

Class subsystem 218 stores information about user-created classes, students, and curricula. Class subsystem 218 allows for aggregation of curricula in order to maximize convenience and enhance the user experience. For example, a user creates a class and selects the licensed content applicable to that class. Then, the user selects various residents across different facilities to receive that curriculum. In this fashion, the user does not have to create the same class multiple times. Class subsystem 218 also includes reporting capabilities to aggregate the information on students, classes, curricula, and educational content into easily readable form.

Synchronization subsystem 220 manages the data exchange between controlled-environment facility 130 and content management center 110. Synchronization subsystem 220 receives an appropriately formatted synchronization request from synchronization management console 131 via web request methods. Synchronization subsystem 220 compares the portable device profile information contained in the synchronization request to the information as stored in the data repository. If differences exist in the educational content, synchronization subsystem 200 initiates a connection with synchronization management center 131 to allow for the downloading of the missing educational content. Such functionality is accomplished utilizing HTTP protocols allowing for the creation of a pipeline between synchronization subsystem 220 and a synchronization management console 131. Synchronization management console 131 then passes the educational content on to portable device 133, which docks in charging and synchronization station 132.

Exemplary Charging and Synchronization Station

FIG. 3 illustrates an exemplary charging and synchronization station 300, according to the embodiments of the present disclosure. Charging and synchronization station 300 represents an exemplary embodiment of charging and synchronization station 132 of FIG. 1. Charging and synchronization station 300 includes cabinet structure 310 and plurality of charging bays 320. Charging and synchronization station 300 serves as an intermediate interface connecting one or more portable devices 133 to a content management center 110 via a synchronization management console 131. Charging and synchronization station 300 provides one or more portable devices 133 with power and a data connection through which to download educational content from content management center 110.

Charging and synchronization station 300 provides a mechanism by which one or more portable devices 133 receive electric power and data in a controlled-environment facility 130. One or more portable devices 133 physically return to charging and synchronization 300 periodically to receive a charge. Administrators then redistribute one or more portable devices 133 to the appropriate residents. In an embodiment, administrators distribute one or more portable devices 133 to residents with a power cable to charge via a wall outlet.

Cabinet structure 310 includes cart-mounted wheels 311 and cart-attached handle 312. Cart-mounted wheels 311 provide for increased mobility of cabinet structure 310. Potentially, controlled-environment facility 130 utilizes multiple synchronization management consoles. In a multi-console environment, the increased mobility provided by cart-mounted wheels 311 allow for charging and synchronization station 300 to move between synchronization management consoles. Similarly, cart-attached handle 312 improves the ease of manual manipulation of the entirety of cabinet structure 310.

Cabinet structure 310 includes adapters that connect to a power source and synchronization management console 131. Cable 313 connects the cabinet structure to a power source, which charges any attached portable devices. In an embodiment, cable 313 provides a data connection to synchronization management console 131 through which educational content downloads to any attached portable devices. Plurality of charging bays 320 includes a data and power connection for each bay. The data connection occurs via a mini-USB-A cable 321 or transpires wirelessly, via a Local-Area Network (LAN), a Wide-Area Network (WAN), or the Internet.

Exemplary Portable Device

FIG. 4 illustrates a block diagram of portable device 400, according to the embodiments of the present disclosure. Portable device 400 provides residents of controlled-environment facility 130 the ability to view educational content downloaded from the central repository of content management center 110. Moreover, portable device 400 provides only the functionality needed to view educational content and any other functions are limited or nonexistent. Due to the operating constraints of controlled-environment facility 130, an exemplary portable device 400 includes no connection to the Internet or other public networks, no games or other forms of entertainment, no audio/visual editors or word processing tools, nor any other tools unrelated to the specific task of interacting with the educational content. In addition, portable device 400 is tamperproof and of prison-grade durability, i.e., built to withstand the rigors of controlled-environment facility 130 when that facility is a prison or correctional institute.

Portable device 400 includes location tracking module 410, processor circuitry 420, communication interfaces 430, display 440, and input/output circuitry 450, which all may be communicatively coupled to each other.

Location tracking module 410 allows portable device 400 to store device-associated, location-related information. The location-related information includes the institution, facility, and specific location within an institution where portable device 400 lives as well as the responsible resident. Location tracking module 410 interacts with display 440 to display the location-related information on the home and locked screens.

Processor circuitry 420 includes one or more processors 421, circuitry, and/or logic configured to control the overall operation of communication device 400, including location tracking module 410, communication interfaces 430, display 440, and input/output modules 450. Processor circuitry 420 further includes memory 422 to store data and instructions. Memory 422 is any well-known volatile and/or non-volatile memory, removable and/or non-removable. In memory 422, clock module 423 stores the current date and time for comparative purposes.

Communication interfaces 430 includes one or more transceivers, transmitters, and/or receivers that communicate via a wireless interface or a wired interface. For example, communication interfaces 430 includes a component, such as a USB cable, enabling communication between portable device 400 and charging and synchronization station 300. Communication interfaces 430 transmits and receives communications between portable device 400 and charging and synchronization station 300.

Display 440 is a component for rendering content onto an output device in a format appropriate for user consumption according to principles of human-computer interaction. Display 440 is a touchscreen and receives touch inputs from its users. Display 440 contains tamperproof glass, which can withstand the rigors of operating within controlled-environment facility 130.

Portable device 400 includes integrated input/output circuitry 450, comprising power module 451, content module 452, synchronization module 453, locking module 454, authentication module 455, and user interface module 456. These modules are communicatively coupled via internal wiring and networking protocols.

Power module 451 includes circuitry for providing power to portable device 400. Power module 451 is a wireless rechargeable battery which can be recharged through various methods. For example, a charging cable connects to a power outlet thereby supplying power to recharge the battery. Power module 451 includes circuitry for powering display 440 and for charging, storing, and maintaining a rechargeable battery inside portable device 400. Power module 451 alerts the resident that the power is low, indicating that portable device 400 must return to charging and synchronization station 300. In an embodiment, power module 451 includes circuitry for charging using a standard power cable in addition to interfacing with charging and synchronization station 300.

Content module 452 includes circuitry enabling users to access any educational content stored on portable device 400. Content module 452 includes a document reader that allows a resident to read educational content in the form of pdfs, word documents, text documents, and others not here listed. Content module 452 includes circuitry enabling a video viewer, for example Windows Media Player or Quicktime Player, on which to video file types including AVI, flash, MWV, MP4, and others not here listed. Content module 452 includes circuitry enabling residents to listen to lectures and other educational content in the form of audio file types including way, mp3, aiff, wma, and others not here listed.

Synchronization module 453 includes circuitry for managing locally stored educational content when portable device 400 engages in the synchronization process. To reiterate, portable device 400 docks physically in charging and synchronization station 300, which connects to synchronization management console 131. Synchronization module 453 formulates a synchronization request by tabulating the locally stored educational content. The synchronization request passes through synchronization management console 131 to content management center 110, where it is compared to the educational content for that device as stored in the central repository. The central repository determines the differences therein. Synchronization module 453 receives a response back indicating the required changes. Based on the response, synchronization module 453: (1) removes any educational content from portable device 400 not included in the device's curricula; (2) downloads and stores locally any educational content not yet residing on the device by copying the intermediate copy of the educational content stored in synchronization management console 131;

and (3) leaves untouched any educational content on portable 400 that remains included in the device's curricula.

Locking module 454 includes circuitry to disable portable device 400 whenever the configured return date arrives. Locking module 454 restricts access to portable device 400 until the device returns to charging and synchronization station 132. There, the return date resets to a future date based upon user input, and locking module 454 restores access to portable device 400. Locking module 454 achieves the lock by engaging power module 451 to disable power to the machine or informing authentication module 455 to lock portable device 400 by disabling login.

Authentication module 455 includes circuitry that verifies that the current user is the resident currently responsible for portable device 400. Authentication module 455 utilizes any or all of username/password, voice signatures, fingerprints, retinal or iris information, facial information, two-factor authentication, and/or token authentication to verify the identity of the user.

User interface module 456 includes circuitry for controlling the dynamic user interfaces displayed by portable device 400 on display 440. User interface module 456 customizes dynamic user interfaces based on the educational content, classes, and curricula pulled for that resident's unique profile. User interface module 456 responds to user inputs in the form of interactions with a touch screen. Accordingly, user interface module 456 provides a dynamic and fully interactive user interface for portable device 400.

Exemplary Synchronization Center Operation

Figure 5:
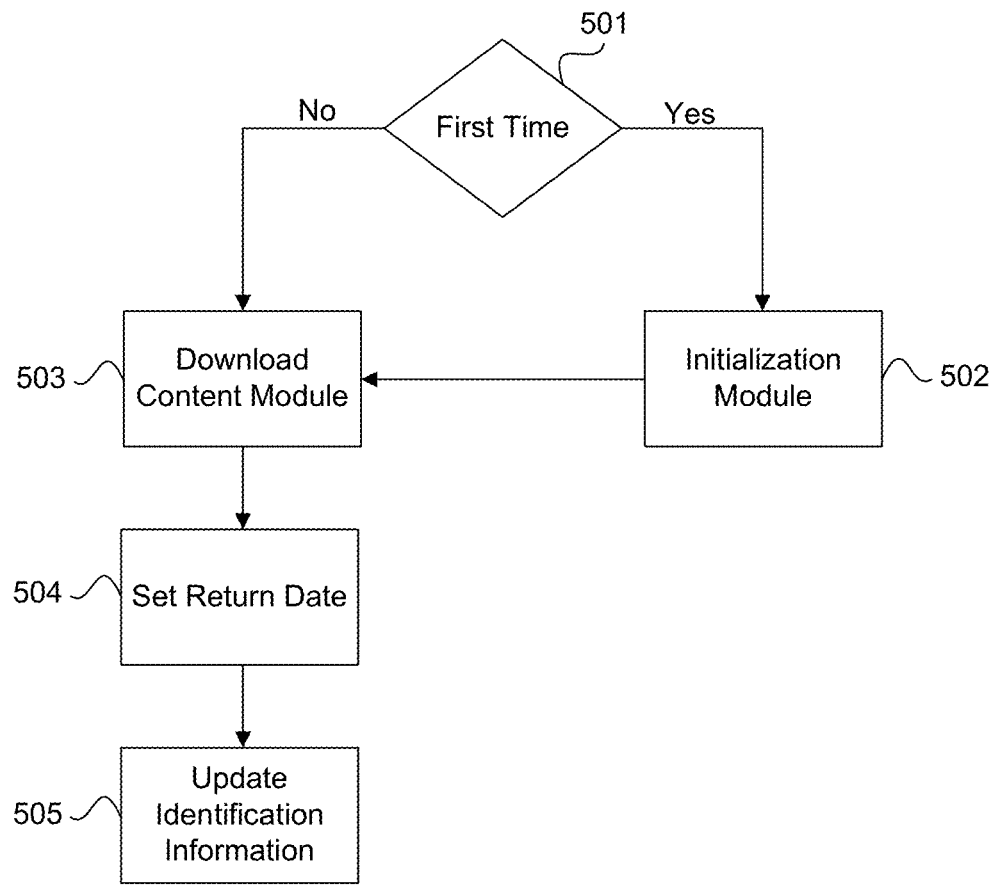
FIG. 5 illustrates a flowchart diagram of a method of synchronizing content when a portable device docks with an exemplary charging and synchronization station, according to the embodiments of the present disclosure.

FIG. 5 illustrates a flowchart diagram of method 500 for synchronizing educational content. Method 500 engages when portable device 400 of FIG. 4 interfaces with charging and synchronization station 300 of FIG. 3. Method 500 includes the following steps: first time decision point 501, initialization module 502, download content module 503, set return date 504, and update identification information 505. One skilled in the relevant art(s) will appreciate that not all steps must execute to perform the disclosure provided herein. Further, some of the steps execute simultaneously, or in a different order than shown in FIG. 5, as will be understood by a person of ordinary skill in the relevant art(s).

In first time decision point 501, portable device 400 determines whether it interfaced previously with charging and synchronization station 300. First time decision point 501 references portable device's profile information in order to make this determination. Portable device 400 maintains profile information tracking this status using a simple Boolean variable.

When portable device 400 interfaces with charging and synchronization station 300 for the first time, initialization module 502 runs. While initialization module 502 executes, portable device 400 displays a yellow light, providing a visual cue that the initialization routine is running to an operator. Such a visual cue is necessary because only one initialization routine can run at once on charging and synchronization station 300; initialization module 502 cannot run concurrently with other instances of initialization module 502. Initialization module 502 applies the settings from charging and synchronization station 300 to portable device 400 and sets portable device 400's status to "operational." Initialization module 502 is skipped if it previously executed on portable device 400.

Download content module 503 bears responsibility for downloading any appropriate educational content to the physical storage of portable device 400. Download content module 503 executes following initialization module 502 or immediately after first time decision point 501, if initialization module 502 is skipped. Download content module 503 initiates a direct connection to content management center 110's educational-content repository. Alternatively, download content module 503 initiates a connection from portable device 400 to synchronization management console 131, where synchronization management console 131 maintains a copy of the educational content.

Upon a successfully completed download of the necessary, up-to-date educational content, set return date 504 updates portable device 400's return date. The return date is the date that portable device 400 must return to charging and synchronization station 300. If the date arrives and portable device 400 has not yet returned to charging and synchronization station 300, locking module 454 engages, and the device stops operating.

Update identification information 505 is responsible for performing any record keeping regarding portable device 400's identifying information. This information includes the institution, facility, and location information associated with portable device 400. This information also includes changes to the responsible resident that would occur when portable device 400 gets assigned to a different resident. Update identifying identification 505 communicates any changes to display 440 in order to display up-to-date information on the lock screen and home screen of portable device 400.

Exemplary Content Management Administration Operation

Figure 6:
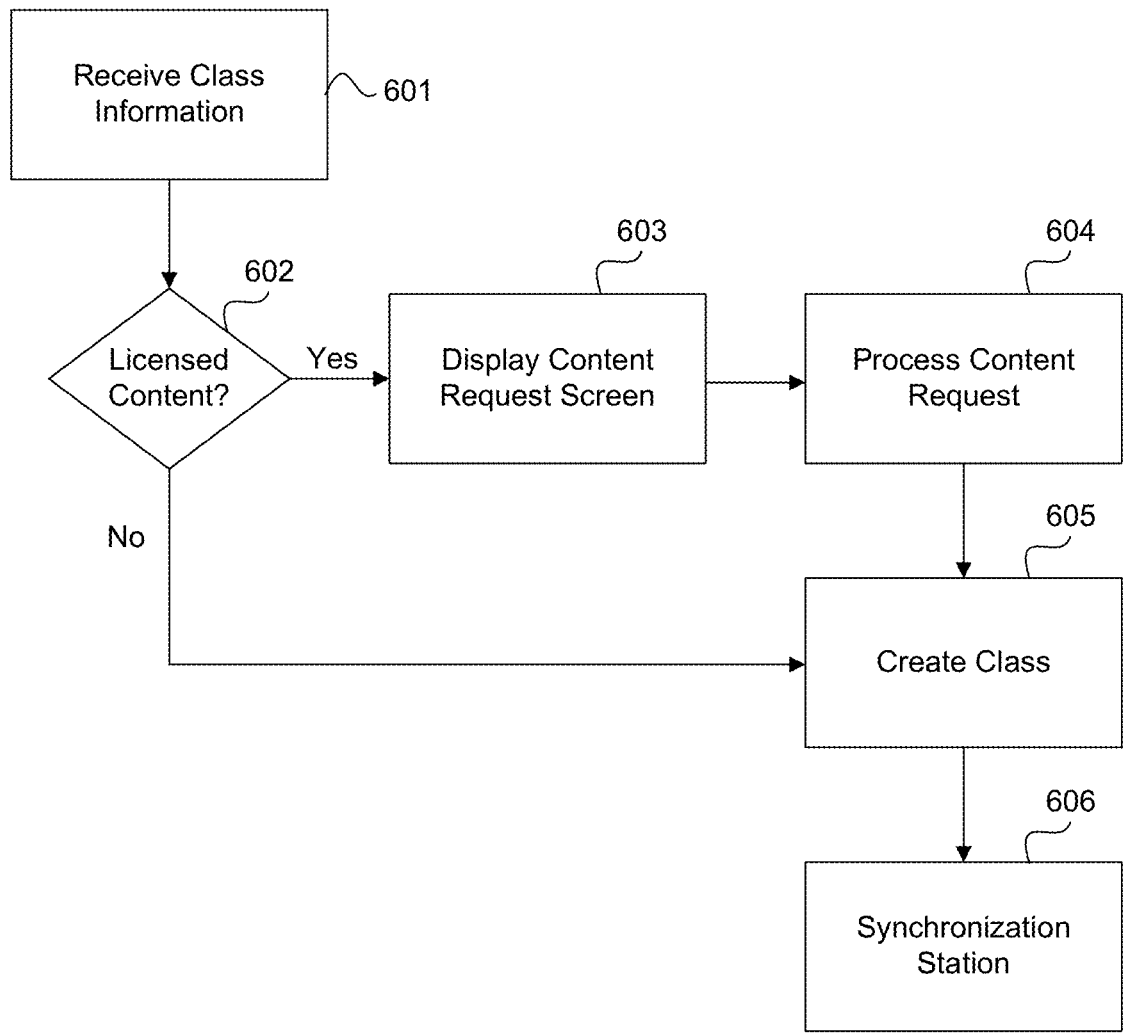
FIG. 6 illustrates a flowchart diagram of a method of class creation in an exemplary educational content administration system, according to the embodiments of the present disclosure.

FIG. 6 illustrates a flowchart diagram of method 600 for creating a class in an exemplary educational content administration system, such as educational content delivery system 100 of FIG. 1, according to the embodiments of the present disclosure. Method 600 executes by processing logic comprising hardware (e.g., circuitry, dedicated logic, programmable logic, microcode, etc.), software (e.g., instructions executing on a processing device), or a combination thereof. Method 600 includes the following steps: receive class information 601, licensed content decision point 602, display content request screen 603, process content request 604, create class 605, and synchronization station 606. One skilled in the relevant art(s) will appreciate that not all steps must execute to perform the disclosure provided herein. Further, in some embodiments, the steps execute simultaneously, or in a different order than shown in FIG. 6, as will be understood and appreciated by a person of ordinary skill in the relevant art(s).

In receive class information 601, content management center 110 receives a class information object from a user on outside workstation 120. A class information object includes a description, a list of students contained therein, and the educational content required by the class's curriculum. Receive class information 601 checks the class information object for compliance with various rules, e.g., the class must include a name, at least one resident, and a modicum of associated licensed educational content.

In licensed content decision point 602, method 600 determines whether the curriculum needs educational content for which no license currently exists. Licensed content decision point 602 automatically generates a content request, which passes to a content administrator in order to obtain the additional licenses. Display content request screen 603 engages in order to acquire further information from the requesting user. Process content request 604 subsequently evaluates the additional content request, parses the information, and completes any content requests.

Following this step, or in the event that licensed content decision point 602 determines that no additional licensed content is required, create class module 605 creates an actual class object within content management center 110. Create class module 605 imbues the object with appropriate parameters, creates the needed data structures, and organizes the data for later recall. Synchronization station 606 pushes this information to exemplary charging and synchronization 300. Subsequent synchronizations with portable device 400 reference the updated information.

Exemplary Computer Implementation

It will be apparent to persons skilled in the relevant art(s) that various elements and features of the present disclosure, as described herein, operate in hardware using analog and/or digital circuits, in software, through the execution of computer instructions by one or more general purpose or special-purpose processors, or as a combination of hardware and software.

This disclosure provides the following description of a general purpose computer system for the sake of completeness. Hardware or a combination of software and hardware implement the embodiments of the present disclosure. Consequently, a computer-system environment or other processing systems achieve the embodiments included in this disclosure. This description describes various software implementations in terms of this exemplary computer system. For example, one or more computer systems or other processing systems carry out the methods of FIGS. 5-6. After reading this description, it will be apparent to a person skilled in the relevant art(s) how to implement the disclosure using other computer systems and/or computer architectures.

Figure 7:
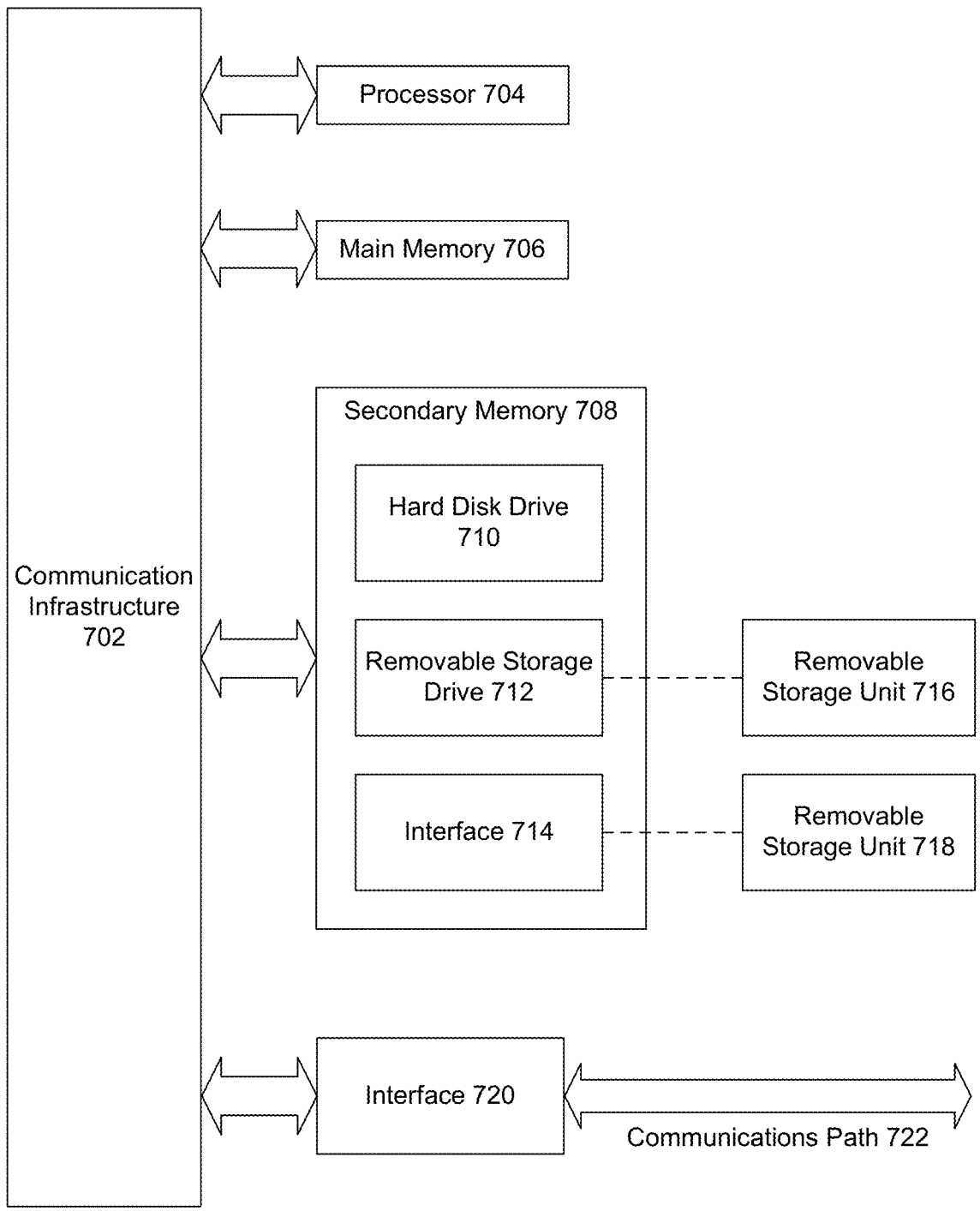
FIG. 7 illustrates a block diagram of a general purpose computer used to perform various aspects of the present disclosure.

FIG. 7 demonstrates an example of a computer system 700. One or more distinct computer systems 700 implement, at least partially, one or more of the modules depicted in the previous figures. Computer system 700 includes one or more processors, such as processor 704. In an embodiment, processor 704 is a special purpose or a general purpose digital signal processor. Processor 704 connects to a communication infrastructure 702 (for example, a bus or network).

Computer system 700 also includes a main memory 706, preferably random access memory (RAM), and in some embodiments also includes a secondary memory 708. In some embodiments, secondary memory 708 includes a hard disk drive 710 and/or a removable storage drive 712, representing a floppy disk drive, a magnetic tape drive, or an optical disk drive. Removable storage drive 712 reads from and/or writes to a removable storage unit 716 in a well-known manner. Removable storage unit 716 represents a floppy disk, magnetic tape, optical disk, or other storage medium, which removable storage drive 712 reads from and writes to.

In alternative implementations, secondary memory 708 includes other similar means for allowing computer programs or other instructions to load into computer system 700. Such means include, for example, a removable storage unit 718 and an interface 714. Examples of such means include a program cartridge and cartridge interface (such as that found in video game devices), a removable memory chip (such as an EPROM, or PROM) and associated socket, a thumb drive and USB port, and other removable storage units 718 and interfaces 714, which allow software and data to transfer from removable storage unit 718 to computer system 700.

Computer system 700 includes interface 720. Interface 720 allows software and data to transfer between computer system 700 and external devices. Examples of interface 720 include a modem, a network interface (such as an Ethernet card), a communications port, and/or a PCMCIA slot and card. Software and data transferred via interface 720 take the form of signals which may be electronic, electromagnetic, optical, or other signals capable of reception by interface 720. These signals reach interface 720 via a communications path 722. Communications path 722 carries signals using wire or cable, fiber optics, a phone line, a cellular phone link, an RF link and/or other communications channels.

As used herein, the terms "computer program medium" and "computer readable medium" refer generally to tangible storage media such as removable storage unit 716, removable storage unit 718, or a hard disk installed in hard disk drive 710. These computer program products provide software to computer system 700.

Computer programs (also called computer control logic) reside in main memory 706 and/or secondary memory 708. Computer programs issue via interface 720. Such computer programs, when executed, enable computer system 700 to implement the present disclosure. In particular, the computer programs, when executed, enable processor 704 to implement the processes of the present disclosure and any of the methods described herein. Accordingly, such computer programs represent controllers of computer system 700. Where the disclosure uses software, the software persists in a computer program product and loads into computer system 700 using removable storage drive 712, interface 714, or interface 720.

In another embodiment, features of the disclosure exist primarily in hardware using, for example, hardware components such as application-specific integrated circuits (ASICs) and gate arrays. Implementation of a hardware state machine so as to perform the functions described herein will also be apparent to persons skilled in the relevant art(s).

Conclusion

The Detailed Description section, not the Abstract section, should be used to interpret the claims. The Abstract section sets forth one or more, but not all exemplary embodiments, and thus, should not limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

Those skilled in the relevant art(s) will appreciate that various changes in form and detail can be made therein without departing from the spirit and scope of the disclosure. Thus, the disclosure should not be limited by any of the above-described exemplary embodiments and should be defined only in accordance with the following claims and their equivalents.

What is claimed is:

1. A system, comprising:
   a centralized repository having a memory configured to store an inventory of educational content, wherein the inventory of educational content is received from a user located outside of a controlled-environment facility through a graphical user interface that connects the user to the centralized repository, and wherein the graphical user interface allows the user to organize the inventory of educational content into one or more class curricula;
   a plurality of portable devices assigned to residents of the controlled-environment facility, wherein the plurality of portable devices permit access only to educational content, and wherein a portable device in the plurality of portable devices locks in response to a current date matching a return date;
a synchronization station located within the controlled-environment facility that serves as an intermediate interface connecting the plurality of portable devices to the centralized repository; and
at least one processor coupled to the centralized repository configured to:
receive a synchronization request from the synchronization station identifying a docked portable device that is connected to the synchronization station;
retrieve a class and a resident associated with the docked portable device;
determine differences between educational content on the docked portable device and educational content associated with the class;
based on the determining, upload additional educational content to the docked portable device and delete a portion of the educational content on the docked portable device that is not associated with the class; and
set the return date to a future date.

2. The system of claim 1, the at least one processor further configured to:
in response to the docked portable device connecting to the synchronization station for a first time, run an initialization routine on the docked portable device.

3. The system of claim 2, wherein the docked portable device displays a visual cue when the initialization routine is running.

4. The system of claim 1, wherein the docked portable device displays a visual cue when the synchronization request is processed.

5. The system of claim 1, wherein the inventory of educational content comprises books, lectures, and coursework pertaining to a voluntary education program.

6. The system of claim 1, wherein the controlled-environment facility is a correctional institute.

7. The system of claim 1, the at least one processor further configured to:
open a consistent pipeline connection between the docked portable device and the centralized repository using a hypertext transfer protocol.

8. The system of claim 1, wherein the synchronization station further comprises a plurality of universal serial bus connectors for connecting the plurality of portable devices to the synchronization station.

9. The system of claim 1, the at least one processor further configured to:
in response to the docked portable device connecting to the synchronization station, perform diagnostic checks on the docked portable device.

10. The system of claim 1, the at least one processor further configured to:
maintain a list of licenses applicable to the inventory of educational content, wherein a license in the list of licenses comprises a particular item of educational content and a license expiration date.

11. The system of claim 10, the at least one processor further configured to:
delete the particular item of educational content from the centralized repository when the current date is later than the license expiration date in the list of licenses corresponding to the particular item of educational content.

12. The system of claim 10, the at least one processor further configured to:
generate a content request that is passed to a content administrator to obtain an additional license when the current date is later than the license expiration date in the list of licenses corresponding to the particular item of educational content.

13. A method, comprising:
storing, by one or more processors, an inventory of educational content in a centralized repository, wherein the inventory of educational content is received from a user located outside of a controlled-environment facility through a graphical user interface that connects the user to the centralized repository, and wherein the graphical user interface allows the user to organize the inventory of educational content into one or more class curricula;
assigning, by the one or more processors, a portable device from a plurality of portable devices, a return date, and a class from the one or more class curricula to a resident of the controlled-environment facility, wherein the plurality of portable devices permit access only to educational content, and wherein the portable device locks in response to a current date matching the return date;
receiving, by the one or more processors, a synchronization request from a synchronization station located within the controlled-environment facility identifying a docked portable device that is connected to the synchronization station, wherein the synchronization station serves as an intermediate interface connecting the plurality of portable devices to the centralized repository;
in response to the synchronization request:
retrieving, by the one or more processors, the class and the resident associated with the docked portable device;
determining, by the one or more processors, differences between educational content on the docked portable device and educational content associated with the class;
based on the determining, uploading additional educational content to the docked portable device and deleting educational content on the docked portable device that is not associated with the class; and
setting the return date to a future date.

14. The method of claim 13, further comprising:
in response to the docked portable device connecting to the synchronization station for a first time, running an initialization routine on the docked portable device.

15. The method of claim 14, wherein the docked portable device displays a visual cue when the initialization routine is running.

16. The method of claim 13, wherein the docked portable device displays a visual cue when the synchronization request is processed.

17. A non-transitory computer-readable storage medium having computer-executable instructions stored thereon that, in response to being executed by a computing device, cause the computing device to perform operations comprising:
storing an inventory of educational content in a centralized repository, wherein the inventory of educational content is received from a user located outside of a controlled-environment facility through a graphical user interface that connects the user to the centralized repository, and wherein the inventory of educational content is organized by the user into one or more class curricula;

assigning a portable device from a plurality of portable devices, a return date, and a class from the one or more class curricula to a resident of the controlled-environment facility, wherein the portable device permits access by the resident only to educational content on the portable device, and wherein the portable device locks in response to a current date matching the return date;

receiving a synchronization request from a synchronization station located within the controlled-environment facility identifying a docked portable device that is connected to the synchronization station, wherein the synchronization station serves as an intermediate interface connecting the plurality of portable devices to the centralized repository;

in response to the synchronization request:

retrieving the class and the resident associated with the docked portable device;

determining differences between educational content on the docked portable device and educational content associated with the class;

based on the determining, uploading additional educational content to the docked portable device and deleting a portion of the educational content on the docked portable device that is not associated with the class; and setting the return date to a future date.

18. The non-transitory computer-readable storage medium of claim 17, the operations further comprising:

in response to the docked portable device connecting to the synchronization station for a first time, running an initialization routine on the docked portable device.

19. The non-transitory computer-readable storage medium of claim 18, wherein the docked portable device displays a visual cue when the initialization routine is running.

20. The non-transitory computer-readable storage medium of claim 17, wherein the docked portable device displays a visual cue when the synchronization request is processed.

* * * * *

UNITED STATES PATENT AND TRADEMARK OFFICE
CERTIFICATE OF CORRECTION

| | | |
|---|---|---|
| PATENT NO. | : 11,699,354 B2 | Page 1 of 1 |
| APPLICATION NO. | : 17/131971 | |
| DATED | : July 11, 2023 | |
| INVENTOR(S) | : Nashe, Jr. | |

It is certified that error appears in the above-identified patent and that said Letters Patent is hereby corrected as shown below:

In the Specification

In Column 10, Line 46, delete "way," and insert -- wav, --, therefor.

Signed and Sealed this
Twelfth Day of September, 2023

*Katherine Kelly Vidal*

Katherine Kelly Vidal
*Director of the United States Patent and Trademark Office*